Patented Sept. 28, 1943

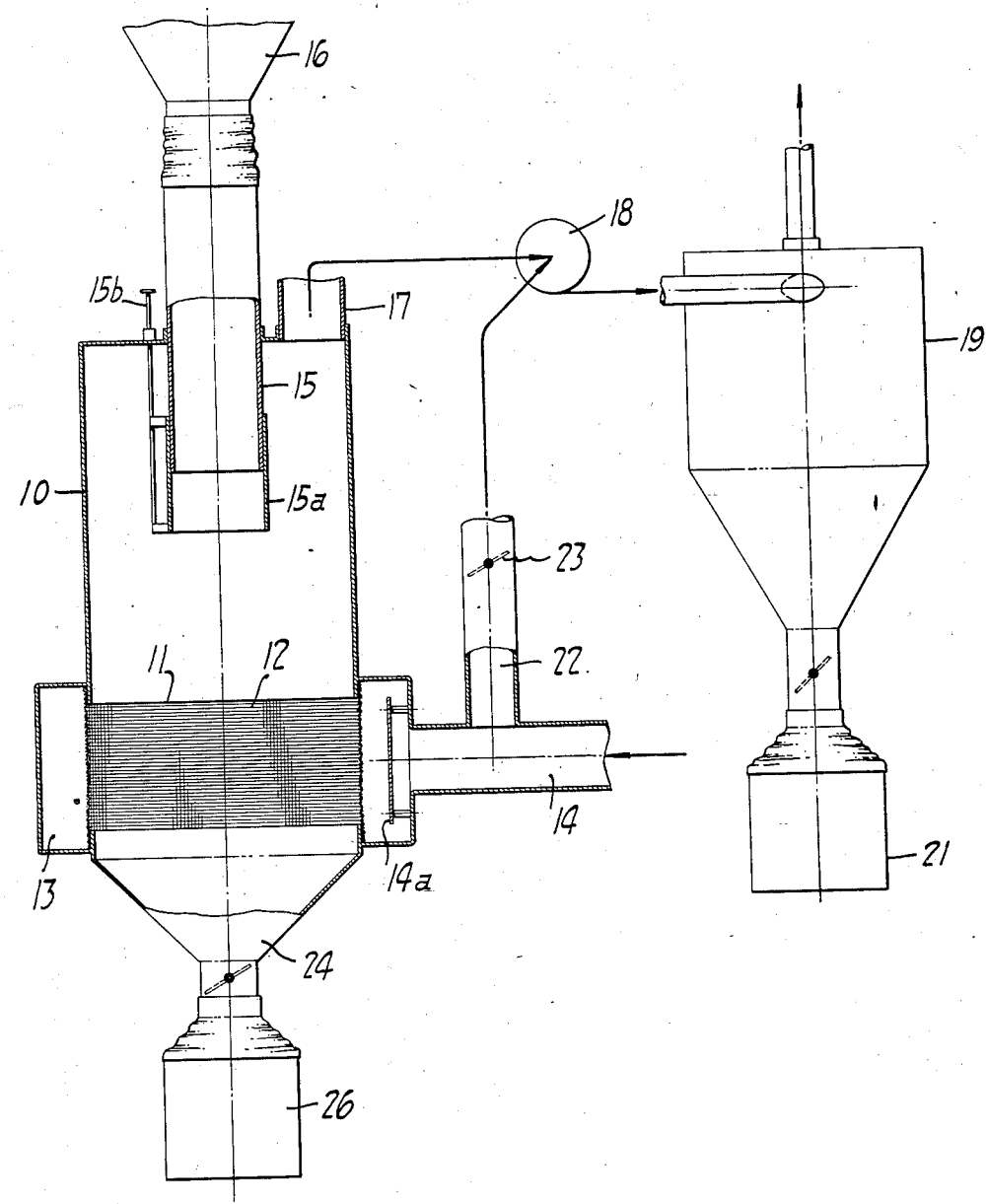

2,330,793

UNITED STATES PATENT OFFICE 2,330,793

CLASSIFYING APPARATUS

David D. Peebles, Berkeley, Calif., assignor to Golden State Company, Ltd., San Francisco, Calif., a corporation of Delaware Application July 31, 1940, Serial No. 348,980

3 Claims. (Cl. 209—139)

This invention relates generally to apparatus of the pneumatic type for classifying various divided materials.

It is an object of the invention to provide classifying apparatus which may be operated over long periods of time without undue accumulations of solid material, such as may interfere with proper operation or cause clogging. In this connection the invention is characterized by an absence of moving parts, and by the elimination of parts upon which solids may accumulate.

Another object of the invention is to provide apparatus capable of efficient classifying action.

Another object of the invention is to provide a simple type of classifying apparatus suitable particularly for use in connection with various food products, such as powdered milk, dried corn syrup, and the like.

Additional objects of the invention will appear from the following description in which I have set forth in detail the preferred embodiment of the invention.

The apparatus shown in the drawing consists of a classifying chamber 10, which is generally upright and cylindrical. Intermediate the upper and lower end of this chamber the walls are interrupted to afford a peripheral annular area 11 through which a stream of gas, such as air, can be introduced. In practice, suitable screening 12 extends across the opening 11, and this screening aids in minimizing turbulence, as will be presently explained. An annular conduit 13 extends about the classifying chamber for supplying gas to the opening 11, and this conduit is shown connected to the inlet conduit 14. A baffle 14a is positioned in front of the inlet condut 14 to prevent direct blowing of air through the adjacent portion of screen 12, thus making for even flow rate of air through all parts of the screened area.

Extending downwardly into the chamber 10, there is a conduit 15 for the purpose of introducing material to be classified. The upper end of this conduit is shown coupled to the lower end of a cyclone separator 16, whereby material collected in the cyclone immediately flows downwardly through conduit 15, into the chamber 10. The lower end of conduit 15 opens downwardly into the classifying chamber, and is concentric with respect to the axis of the chamber. A separate conduit section or extension 15a can be provided, so that the effective elevation of the lower end can be adjusted with respect to the opening 11. A hand rod 15b is shown to facilitate making such adjustments.

In order to maintain an upwardly moving column of gas in chamber 10, the upper end of the chamber is connected to the conduit 17 through which gas is withdrawn, and which is shown connecting to the blower 18. The discharge side of this blower is shown connected to the cyclone 19, from which collected material can be withdrawn to the container 21. For the purpose of controlling the upward velocity of gas in the classifying chamber, a by-pass conduit 22 is shown connecting inlet conduit 14 with the suction side of blower 18. Assuming that blower 18 has a fixed capacity, adjustment of the damper or valve 23 in conduit 22 will serve to vary the rate of removal of gas through the conduit 17.

Below the opening 11, the classifying chamber is provided with means for the collection of one of the classified fractions. Thus the lower portion 24 of the chamber is conical shaped, and material collected within this portion can be drawn off continuously or intermittently to an external container 26. Containers 21 and 26 may be barrels or storage drums having temporary connections with the apparatus, until filled.

To describe operation of the apparatus, it will be presumed that the material being handled is powdered skim milk, as it is received from a spray drier. This material together with some gas is withdrawn from the lower end of cyclone 16 through conduit 15, and introduced into the classifying chamber 10 in a region intermediate the upper end of this chamber, and the opening 11. Introduction of air or other gas through opening 11 at a constant rate causes relatively evenly distributed upward flow of air within chamber 10, and around conduit 15 past its lower open end. As the powdered milk leaves the lower end of conduit 15, it tends to spread outwardly somewhat, and intermingles with the upwardly flowing air. Particles constituting the finer fraction are carried upwardly and discharged from conduit 17, while coarser or heavier particles pass downwardly to be entrapped in the lower portion 24 of the chamber, where the air is quiescent. The fraction withdrawn through conduit 17 is delivered to the cyclone 19 where it is separated from the conveying air. The fraction collected in the lower chamber portion 24 can be removed continuously or from time to time, as desired. Where the material is being made by equipment such as a spray drier, it may be at an elevated temperature as it enters the classifying chamber. Cool air drawn in through inlet 14 serves to effect cooling of such hot material, simultaneously with classification. Where the powdered material is apt to absorb moisture, the air supplied to inlet 14 can be dehumidified.

It will be apparent that the apparatus must be operated and adjusted with due regard to the material being classified, and to the type of classification desired. When the apparatus is operating as desired, on a material such as powdered milk, it will be found that it is quite critical to changes in the height of the lower end of the conduit 15 with respect to opening 11. In employing the apparatus upon different types of materials, and under different operating conditions, one can readily attain the desired classification by adjustments of the damper 23 in conduit 22, and also by adjusting the height of the conduit extension 15a.

A feature of my apparatus is that it will operate for long periods of time without accumulations of material within the classifying chamber, such as might cause impairment of operation or clogging of the equipment. It will be noted that there are no surfaces or parts upon which solid material might accumulate. In addition there are no moving parts to the equipment, other than the blower 18 for maintaining the air flow, and therefore the equipment is not subject to mechanical deterioration, and it is relatively economical to construct and maintain.

I claim:

1. In classifying apparatus, a generally upright classifying chamber, a substantially continuous foraminous wall extending about the periphery of said chamber, for introducing gas into the chamber in a region located intermediate the upper and lower ends of said chamber, an annular conduit enclosing said foraminous wall, a gas inlet conduit opening into said annular conduit, a baffle positioned within said annular conduit in front of said gas inlet conduit, a material introducing conduit extending vertically downward into said chamber for introduction of material to be classified, said material introducing conduit having a downwardly directed discharge end located intermediate the region of introduction of gas and the upper end of the chamber, whereby one fraction of the material being classified is carried upwardly with an upwardly moving column of gas and another fraction moved downwardly toward the lower end of the chamber, and means at the lower end of the chamber for removing the last named fraction.

2. In classifying apparatus, a generally upright classifying chamber, means for introducing gas into the chamber in a region located intermediate the upper and lower ends of said chamber, said gas being introduced through an annular area extending about the periphery of the chamber, said gas introducing means including an inlet conduit connected to said annular area and means for withdrawing gas from the upper end of the chamber, a material introducing conduit extending vertically downward into said chamber for introduction of material by gravity flow to be classified, said material introducing conduit having a downwardly directed discharge end located intermediate the region of introduction of gas and the upper end of the chamber, and spaced above said region of gas introduction, said chamber being unobstructed between said discharge end and said region of gas introduction, whereby one fraction of the material being classified is carried upwardly with an upwardly moving column of gas and another fraction moved downwardly toward the lower end of the chamber, means at the lower end of the chamber for removing the last named fraction, and an adjustable by-pass extending between said gas withdrawing means and said inlet.

3. In classifying apparatus, a generally upright classifying chamber, a substantially continuous foraminous wall extending about the periphery of said chamber for introducing gas into the chamber in a region located intermediate the upper and lower ends of the chamber, an annular conduit enclosing said foraminous wall, a gas inlet conduit opening into said annular conduit, air distributing means in said annular conduit to effect substantially equalized flow of gas through said foraminous wall into the chamber, a material introducing conduit extending vertically downward into said chamber for introduction of material to be classified, said material introducing conduit having a downwardly directed discharge end located intermediate the region of introduction of gas and the upper end of the chamber, whereby one fraction of the material being classified is carried upwardly with an upwardly moving column of gas and another fraction moved downwardly towards the lower end of the chamber, and means at the lower end of the chamber for removing the last named fraction.

DAVID D. PEEBLES.